United States Patent [19]

Petrak

[11] Patent Number: 4,557,358
[45] Date of Patent: Dec. 10, 1985

[54] SYNCHRONIZED CLUTCH ASSEMBLY WITH SELECTIVE OVERRIDE FOR FOUR-WHEEL DRIVE VEHICLES

[75] Inventor: Harry A. Petrak, Boulder, Colo.

[73] Assignee: Tenneco Inc., Lincolnshire, Ill.

[21] Appl. No.: 472,028

[22] Filed: Mar. 4, 1983

[51] Int. Cl.$^4$ .................. F16D 11/06; F16D 43/02; B60B 27/00
[52] U.S. Cl. .................. 192/35; 192/49; 192/54; 192/56 R; 192/93 A; 192/67 R; 180/233; 403/1
[58] Field of Search .................. 192/35, 49, 50, 54, 192/56 R, 67 A, 67 R, 93 A, 108; 403/1; 180/233

[56] References Cited

U.S. PATENT DOCUMENTS

| | | | |
|---|---|---|---|
| 2,781,882 | 2/1957 | Burkhardt | 192/56 R |
| 3,217,847 | 11/1965 | Petrak | 192/31 |
| 3,249,188 | 5/1966 | Maina | 192/67 R |
| 3,442,361 | 5/1969 | Hegar | 192/67 R |
| 3,656,598 | 4/1972 | Gable | 192/50 |
| 4,192,411 | 3/1980 | Fogelberg | 192/67 R |
| 4,238,014 | 12/1980 | Petrak | 192/93 A |
| 4,281,749 | 8/1981 | Fogelberg | 192/49 |
| 4,287,972 | 9/1981 | Petrak | 192/93 A |
| 4,300,667 | 11/1981 | Fogelberg | 192/93 A |
| 4,352,418 | 10/1982 | Teraoka | 192/93 A |

Primary Examiner—Rodney H. Bonck
Assistant Examiner—Alan G. Towner
Attorney, Agent, or Firm—Thomas E. Torphy

[57] ABSTRACT

An automatic locking gear is adapted to drivingly connect a drive axle and wheel hub automatically in response to application of torque to the drive axle which has a stationary housing in which said drive axle is journaled, a drive gear keyed for rotation with the drive axle while being slidable in an axial direction independently of the drive axle, and a driven gear is keyed for rotation with the wheel hub while being slidable in an axial direction independently of the wheel hub. The locking member is mounted on the stationary housing, and the cam follower mounted on the drive gear. The cam follower control means is operative to advance the cam follower in a direction causing the drive gear to move into engagement with the driven gear in response to the application of torque to the drive gear, the control means in turn being released from engagement with the locking member in response to engagement between said drive gear and said driven gear; and an override mechanism is interposed between the locking member and housing to release the locking member for limited rotation in response to the application of torque from the driven gear into the drive gear prior to releasing the control means from locking engagement with the locking member.

17 Claims, 15 Drawing Figures

SYNCHRONIZED CLUTCH ASSEMBLY WITH SELECTIVE OVERRIDE FOR FOUR-WHEEL DRIVE VEHICLES

This invention generally relates to automatic clutch assemblies, and more particularly relates to a novel and improved synchronized automatic clutch assembly with a selective override which is specifically adaptable for use in four-wheel drive vehicles to enable safe, dynamic engagement between the drive and driven gears at opposite ends of a drive axle.

BACKGROUND AND FIELD OF THE INVENTION

In my U.S. Pat. No. 4,287,972 for AUTOMATIC CLUTCH ASSEMBLY, there is disclosed a novel and improved form of clutch which is capable of effecting positive engagement between a drive member and driven member in response to the application of torque to the drive member; and further to effect positive disengagement when torque is removed and the direction of rotation of the drive member is reversed. This is done through the cooperation of concentrically arranged cam members having aligned slots, each set of aligned slots receiving a cam follower in the form of a roller pin which is associated with a drive member; rotation of the drive member will then cause each roller pin to advance in a predetermined direction along the aligned slots and to carry the drive member into engagement with the driven member. Once the engagement position is made, one of the concentric cam members is forced away from a normally locked or fixed position while the other cam member will continue to retain the roller pins in a raised position maintaining engagement between the drive and driven members irrespective of whether torque is still applied to the driving member. It is therefore necessary to reverse the rotation of the driven member to impart a reverse movement to the cam followers within the slots and to cause the one cam member to return to its original locked position as the drive member is forced away from engagement with a driven member. This arrangement has particular advantages when applied to conversion of the two-wheel drive vehicles in and out of four-wheel drive in that the drive member can be splined to the axle for engagement with a driven member associated with the wheel hub whenever torque is applied to the axle. The wheel hub will remain engaged so long as rotation continues in a given direction notwithstanding any resistance of the driving member and drive train. Also, the drive member will continue to engage the driven member associated with the wheel hub after torque has been removed from the drive member, not-withstanding power train resistance, so long as the driven member turns the driving member in the same rotational direction.

It is an aim of the present invention to lend further novel and improved characteristics to clutch assemblies of the type described in my hereinbefore referred to patent and particularly to the end of further enhancing the safety and reliability of same under all operating conditions and to further minimize any possibility of damage to the parts under abusive operating conditions.

The novel features and characteristics of the present invention may be best exemplified by describing its use in conjunction with four-wheel drive motor vehicles of the type having a synchronized transfer case which will enable the vehicle operator to selectively engage or disengage power into a front propeller shaft so that in the four-wheel drive mode the operator will have shifted the transfer case whereby power is transmitted through the front propeller shaft to both of the front wheels as well as the power which is transmitted to the rear wheels. Typically, the front propeller shaft and differential are laterally offset to permit vertical suspension movement or thrusting in relation to the chassis during vehicle operation. As a result, there is a substantial variation in linear distance of power transmission from the transfer case into each of the front wheels as well as the rear drive axle. When shifted to the four-wheel drive mode, the front wheel located nearest to the differential and power shaft will receive a torque impulse slightly ahead of the other wheel and accordingly there is a disproportionate application of torque during vehicle start-up in the four-wheel drive mode. Disproportionate applications of torque are experienced also when the vehicle operator is required to apply forward and reverse cycling applications of torque to rock the vehicle forwards and backwards to become unstuck and which torque imbalance is aggravated greatly by varying degrees of surface adhesion of the wheels during a rock cycle.

In recent years, at least one of the vehicle manufacturers has introduced a synchronized transfer case which is a form of friction clutch for imparting torque and rotation to the front propeller shaft prior to mechanical engagement of the front propeller shaft. In other words, after the front propeller shaft is brought up to the speed of the transfer case gearing, the transfer case will then mechanically engage the front propeller shaft. Accordingly, while clutch assemblies presently in use would permit shifting to the four-wheel drive mode when the vehicle was standing still, the advent of the synchronized transfer case permits dynamic engagement; or, in other words, shifting of the vehicle from two-wheel drive to four-wheel drive while the vehicle is moving at speeds on the order of 30 mph to 50 mph. When shifted "on the fly", the transfer case will turn the propeller shaft at a relatively low rpm but with sufficient torque to actuate the clutch assemblies on the front wheels toward engagement. Thus, the vehicle wheels and driven or receiving gears in the clutch assemblies may be rotated at 400 rpm to 600 rpm when the drive gear is moving into engagement at a much lower rpm. By virtue of the receiving gear being driven at a higher rpm than the drive gear, it will prevent any penetration by the drive gear into intermeshing engagement with the driven gear until the drive gear is finally brought up to a speed closely approximating that of the receiving gear, at which point the drive gear will begin to penetrate the driven gear to an extent such that the receiving gear will act as the drive gear and begin to apply torque to the normal drive gear. It is important to recognize that until the drive gear is permitted to move into a position of intermeshing engagement with the driven gear it will be effectively locked against rotation by its actuating mechanism unless some means is provided to override the locking resistance and permit the drive gear to undergo limited rotation sufficient to become synchronized with and penetrate the rotating driven gear. Essentially, a change or increase in speed of the axle drive gear to the higher rpms necessary to match wheel speed will occur within a limited time on the order of one second or less and it is therefore highly desirable that the locking resistance to drive gear rotation be overcome and overridden for that limited time interval necessary to permit dynamic engagement between the gears.

Under the conditions described and specifically as the drive and driven gears approach the pre-engagement condition in which the ears are nearly matched in speed, there is a tendency to develop a mild ratcheting or chattering at the gear interface which in the case of conventional square-edged splined faces at the interface will tend to deform the intercepting edges so as to prevent full engagement between the gears, chipping of the edges of the gears at the interface as well as wear and abrupt engagement. It is therefore desirable to avoid danger of any damage to the interfacing gear edges while at the same time to encourage more rapid, smoother penetration of the drive gear into intermeshing relation to the driven gear particularly in the course of dynamic engagement.

Still another problem to overcome is that of compensating for the disproportionate application of torque to opposite ground-engaging wheels particularly under the aforementioned conditions. It is desirable to synchronize the actuation of the clutch assemblies both in the course of engagement and disengagement so as to compensate for disproportionate application of torque as well as to prevent generation of false torques in the two-wheel drive mode which would otherwise tend to actuate the clutch assemblies accidentally.

Other representative patents, in addition to my hereinbefore referred to U.S. Pat. No. 4,287,972 are U.S. Pat. Nos. 3,217,847 and 4,238,014 to the present applicant; M. J. Fogelberg U.S. Pat. Nos. 4,192,411, 4,281,749 and 4,300,667; F. Hegar U.S. Pat. No. 3,442,361; and R. W. Goble U.S. Pat. No. 3,656,598.

SUMMARY OF THE INVENTION

It is therefore an object of the present invention to provide for a novel and improved automatic clutch assembly which is adapted for use with four-wheel drive vehicles.

It is another object of the present invention to provide for a novel and improved automatic clutch assembly which will permit dynamic engagement between the drive and driven members of the assembly.

A further object of the present invention is to provide for a novel and improved clutch assembly which when employed in pairs at opposite ends of a driving member will compensate for disproportionate applications of torque and effectively synchronize the actuation of the clutch assemblies into separate members to be driven at opposite ends of the drive member.

A further object of the present invention is to provide for a novel and improved automatic clutch assembly adaptable for four-wheel drive vehicles which will prevent abnormal abrasive or abusive torque applications to the drive train and greatly minimize damage to the drive train; and further wherein the clutch assembly is capable of effective dynamic engagement between drive and driven members so as to permit shifting of the vehicle into four-wheel drive while the vehicle is moving at high rates of speed.

It is an additional object of the present invention to provide for a synchronized automatic clutch assembly with selective override for use in combination with four-wheel drive vehicles wherein the clutch assembly will selectively override a locking member to permit effective engagement between drive and driven gears when the vehicle is moving, the selective override being adjustable to be responsive only to application of predetermined torque without necessity of modifying or changing the parts, manufacturing, tooling or processes; and wherein the clutch assembly of the present invention is readily conformable for use singly or in pairs for different applications without the need for special or frequent maintenance, lubricants or sealing.

In accordance with the present invention, a clutch assembly for four wheel drive motor vehicle has actuator mechanisms operative to drivingly interconnect rotatable drive and driven members at opposite ends of a drive axle when torque is applied to the drive axle, each actuator mechanism including cam control means normally fixed against rotation, cam follower means movable in response to the application of torque to the drive member to cause the drive member to be drivingly connected to the driven member, and a locking member including spaced inner and outer concentric portions, one of the portions permanently fixed against rotation. Locking means is interposed between the inner and outer concentric portions normally locking the other of the portions against rotation, the cam control means connected to the other of said portions so as to be normally locked against rotation, and which locking means is releasable under applied rotative force to the other of said portions by the cam control means prior to release of the cam follower means from locking engagement with the locking member.

More particularly, an automatic locking gear is adapted to drivingly connect a drive axle and wheel hub automatically in response to application of torque to the drive axle which has a stationary housing in which said drive axle is journaled, a drive gear keyed for rotation with the drive axle while being slidable in an axial direction independently of the drive axle, and a driven gear is keyed for rotation with the wheel hub while being slidable in an axial direction independently of the wheel hub. In this arrangement, the locking member is mounted on the stationary housing, and the cam follower mounted on the drive gear. The cam follower control means is operative to advance the cam follower in a direction causing the drive gear to move into engagement with the driven gear in response to the application of torque to the drive gear, the control means in turn being released from engagement with the locking member in response to engagement between said drive gear and said driven gear; and an override mechanism is interposed between the locking member and housing to release the locking member for limited rotation in response to the application of torque from the driven gear into the drive gear prior to releasing the control means from locking engagement with the locking member. Preferably, the locking member is defined by inner and outer spaced concentric sleeve members, the inner sleeve being permanently affixed to the housing, and the release means includes a plurality of compressible spring members of a diameter greater than the radial spacing between the inner and outer concentric sleeves, the spring members being disposed in recessed portions between the sleeves whereby to normally limit rotative movement of the outer concentric sleeve with respect to the inner concentric sleeve until the application of torque to the outer concentric sleeve is sufficient to override the spring tension of the springs.

The above and other objects, advantages and features of the present invention will become more readily appreciated and understood when taken together with the following detailed description of a preferred embodiment of the present invention in conjunction with the accompanying drawings, in which:

DETAILED DESCRIPTION OF THE PREFERRED EMBODIMENT

Figure 1:
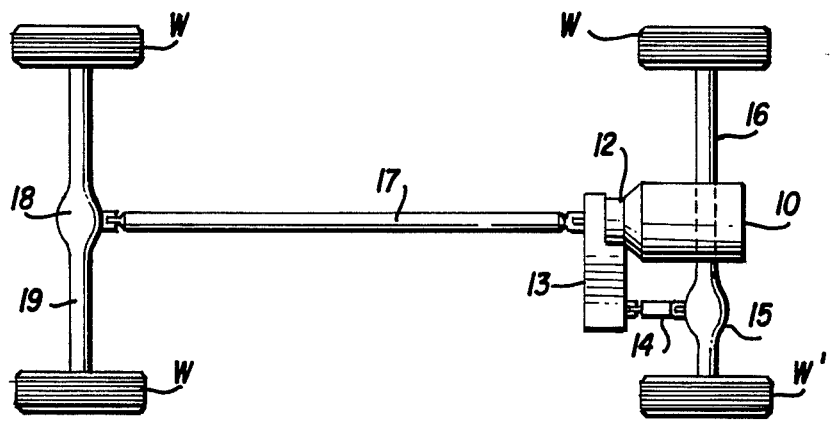
FIG. 1 is a top plan view somewhat schematically illustrating the basic relationship between elements in the drive train of a contemporary vehicle.

As illustrated in FIG. 1, the drive train for a conventional automotive vehicle may be broadly comprised of an engine 10 having a transmission 12 with a transfer case 13 to effect engagement and disengagement between the transmission and a front propeller shaft 14 which is coupled to the front differential 15 of front axle 16. A rear propeller shaft 17 is operated off the transfer case into a rear differential 18 of rear axle 19, the front and rear axles 16 and 19 imparting rotation to the four ground-engaging wheels designated at W. As illustrated, the flow of power from the engine 10 into the transmission 12 is in turn transmitted through the shiftable transfer case 13 and allows the vehicle operator to selectively engage or disengage power to the front propeller shaft 14 which is laterally offset from the engine. In the two-wheel drive mode, the front propeller shaft is disengaged and the power is transmitted entirely through the rear propeller shaft 17 to the rear wheels. In the four-wheel drive mode, the operator will have shifted the transfer case to engage the front propeller shaft so that power is transmitted both to the front and rear wheels. As previously noted, the front propeller shaft must be laterally offset in most vehicle designs to accommodate vertical space requirements and permit vertical suspension or thrusting in relation to the chassis. Accordingly, the front power train offset results in a considerable variation in linear distance and power transmission from the transfer case to each of the front wheels and the rear drive axle. In the four-wheel drive mode, the wheel W' connected to the shorter drive shaft will receive a torque impulse at some limited time interval ahead of the opposite wheel. In a split second response, if the wheel W' offers resistance resulting from good tire adhesion to the surface most of the torque transmitted to the front end will be transmitted initially to wheel W', then split between both the front wheels if each has equal adhesion. Thus, it is common for a front wheel assembly to receive a disproportionate application of torque during vehicle start-up in the four-wheel drive mode not only from its linear relationship to the power source but also as a result of the higher front wheel loading imposed by the engine mass with generally higher front wheel adhesion to the ground surface.

Figure 2:
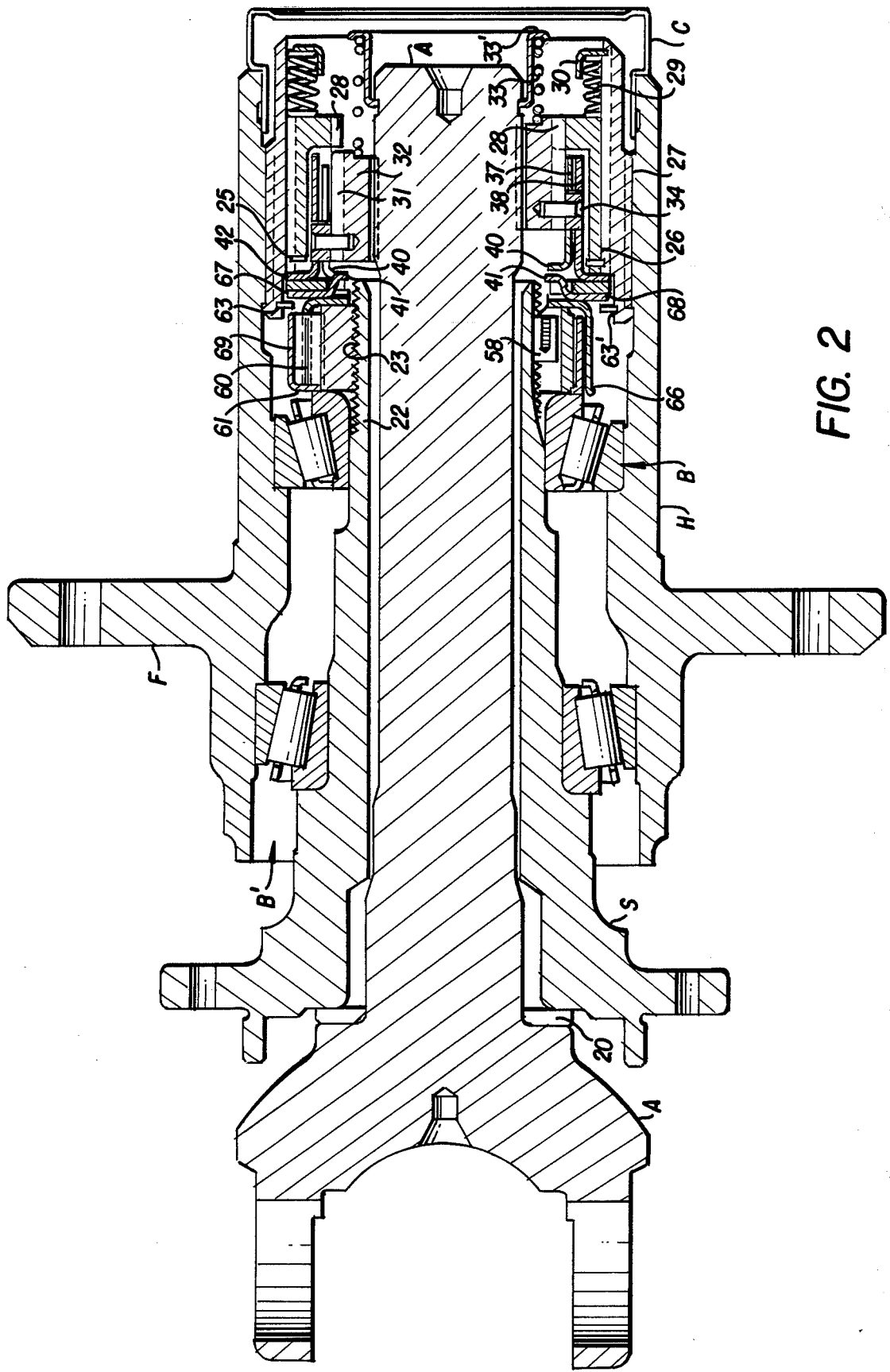
FIG. 2 is a cross-sectional view illustrating the two-wheel and four-wheel drive positions of a preferred form of clutch assembly in accordance with the present invention when applied to an automotive vehicle.

As seen in more detail from FIG. 2, each of the front wheels W and W' is fixed for rotation on a wheel hub H which is disposed in outer spaced concentric relation to a spindle S by wheel bearing assembles designated at B and B', the spindle S being disposed in surrounding relation to a shorter drive shaft A forming a part of the front axle 16 and separated therefrom by a thrust bearing 20, all in accordance with wellknown practice. The spindle includes an end portion 22 which is externally threaded at 23 to receive one form of spindle lock assembly 24, the latter disposed to bear against the outboard end of the wheel bearing assembly B. The hub H is of hollow, generally cylindrical configuration with a radially directed connecting flange designated at F for connection of each wheel W, and a cupped cover C serves to enclose the outboard extremity of the hub H. In order to effect selective engagement between the drive shaft A and hub H, a driven or receiving gear 26 is externally splined for axial sliding movement within a ring gear adapter 27, the latter being externally splined, also, along the inner wall of the hub H internal to the cupped cover C, the gear 26 yieldingly urged against a retainer ring 25 by a series of compression springs 29 disposed within a spring retainer cap 30 affixed near the outboard end of the adapter 27. A series of axially directed teeth 28 are disposed on a radial inward projection of the ring gear so as to be in the path of movement of a series of complementary teeth 31 on the outer periphery of a drive gear 32 which is splined for limited axial sliding movement on the end of the drive shaft A. The drive gear 32 similarly is a ring gear yieldingly retained in the desired relation to the ring gear 26 by a retainer spring 33 disposed within the retainer cap 33' mounted at the end of the drive shaft with the inboard end of the coiled spring 33 bearing against the outboard end of the drive gear 32.

In order to impart axial sliding movement to the drive gear 32 into intermeshing engagement with the driven gear 26 and effectively couple the wheel hub H for rotation with the drive shaft A, a series of cam followers or roller pins 34 are disposed in equally spaced relation about the outer periphery of the drive gear 32, each cam follower 34 protruding into a pair of inner and outer concentric cam slots 35 and 36, respectively, on cam members 37 and 38. Each of the cam members 37 and 38 is of tubular configuration with the inner cam member 37 having a series of radially inwardly directed tabs or extensions 40 at its inboard end to enter between and interengage with inwardly directed teeth 41 at the outboard end of the cam lock assembly 64. However, the inboard end of the outer cam 38 is provided with a radially outwardly directed flange or extension 42 which is disposed adjacent to assembly 24 in a manner hereinafter described so as to prevent axial movement of the outer cam member 38 but permit its free rotation when inner cam member 37 is not locked against rotation by the assembly 24.

Figure 4:
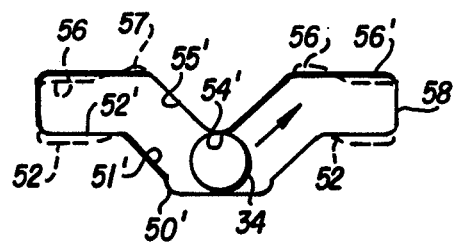
FIG. 4 is a view in elevation and enlarged of the cam members employed in the preferred form of the present invention.
Figure 5:
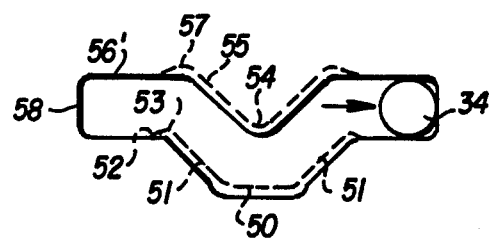
FIG. 5 illustrates the advancement of a cam follower element with respect to the cam slots in the cam members illustrated at FIG. 4.
Figure 7:
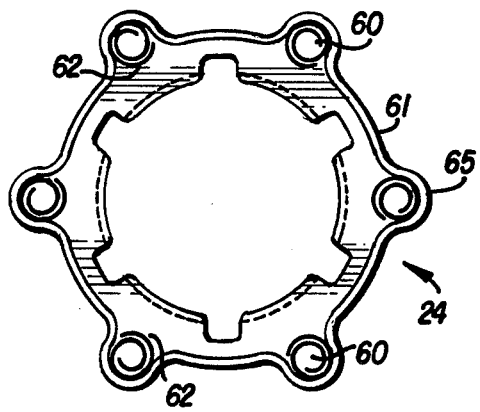
FIG. 7 is an end view of the override assembly shown is FIG. 6.
Figure 6:
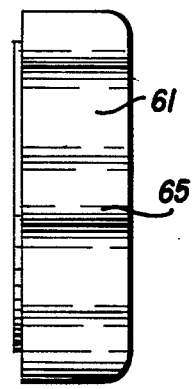
FIG. 6 is a side view in elevation of a preferred form of an override spindle lock assembly forming a part of the preferred form of the present invention.
Figure 3:
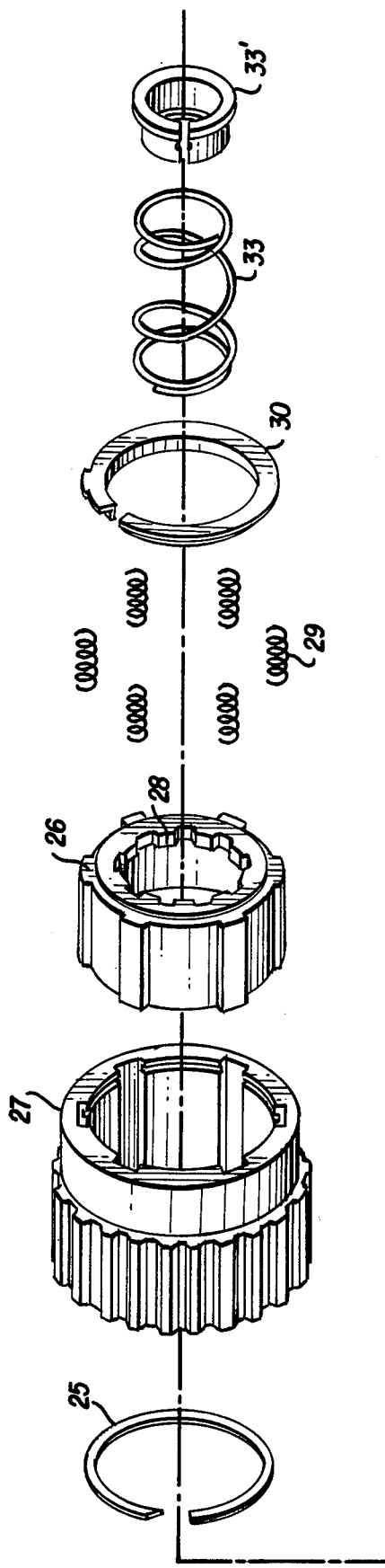
FIG. 3 is an exploded view illustrating the parts comprising the preferred form of clutch assembly shown in FIG. 2.
Figure 3:
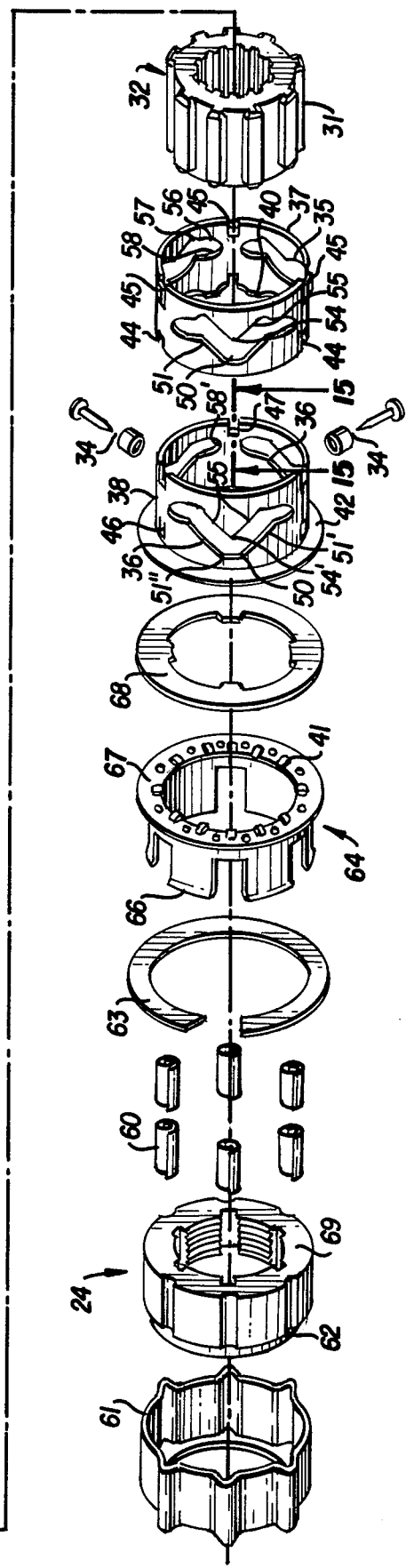

From a more detailed consideration of FIGS. 3, 4 and 5, the inner cam member 37 is in the form of a thin-walled sleeve having a series of three generally V-shaped, winged cam slots 35 preferably formed at equally spaced 120° intervals through the intermediate wall of the sleeve. A plurality of axially directed, open slots 44 extend intermediately between the cam slots 35 at the inboard end, and three radially outwardly inclined tabs 45 are formed out of the wall of the cam 37 adjacent to its outboard end intermediately between the cam slots 35. The outer concentric cam member 38 is similarly in the form of a thin-walled sleeve having three generally V-shaped winged slots 36 at equally spaced circumferential intervals, or 120° apart, and are formed through the intermediate wall of the body of the cam 38. Open slots 47 are formed intermediately between the cam slots 36 adjacent to the outboard end of the cam 38, and radially and inwardly inclined tabs 46 are formed intermediately between the cam slots 36 adjacent to the inboard end above the flange 42. When the inner cam 37 is inserted within the outer cam 38, the outwardly projecting tabs 45 are aligned within the slots 47 and the open slots 44 are aligned with the tabs 46 so as to initially fix the inner cam against rotation with respect to the outer cam while permitting a limited degree of independent axial sliding movement of the inner cam with respect to the outer cam. Once the cam members 37 and 38 are aligned as described, the inner cam slots 35 are similarly aligned with respect to outer cam slots 36 to permit insertion of one of the roller pins 34.

As shown in FIGS. 4 and 5, in the preferred form of invention and in a manner corresponding to that disclosed in my hereinbefore referred to U.S. Pat. No. 4,287,972, each inner cam slot 35 is provided with a bottom or inboard horizontal bearing surface 50, inclined bearing surfaces 51 diverging at substantially 45° to 60° angles away from the surface 50 to intersect a downwardly inclined bearing surface 52 at point 53, the downwardly inclined bearing surface 52 inclining at an angle of approximately 20° from the horizontal away from the point 53. Outboard upper inclined bearing surfaces 55 diverge away from a point of intersection 54 and intersect downwardly inclined bearing surfaces 56 at points 57, the surfaces 56 being spaced above the surfaces 52. Axially directed surfaces 58 extend between the outer lateral edges of the bearing surfaces 52 and 56 so as to close opposite lateral edges of the cam slot.

The aligned bearing surfaces on the outer cam slots 36 generally corresponding to those of the inner cam slots 35 are enumerated with like prime numerals. Specifically, the inclined surfaces 55' and 51' are inclined at angles corresponding to those of the bearing surfaces 55 and 51 of the inner cam 37, respectively. However, a slight step or increase in slope is formed at the bottom or inboard end surfaces 51 and 51' which intersect with the circumferentially extending bearing surface 50 and 50' and designed in a manner similar to that disclosed in my hereinbefore referenced U.S. Pat. No. 4,238,014 but with an increased slope more nearly approximately an axial direction along the interfacing surface 51 and 51', then diverging into a more gradual slope on the order of 45° to 60° along the inclined surfaces 51 and 51'. Moreover, the upper and lower bearing surfaces 56' and 52' extend in a horizontal direction away from their intersection with the inclined bearing surfaces 51' and 55', as opposed to the downwardly directed or sloped disposition of the surfaces 52 and 56 on the inner cam member 37.

When the vehicle is in two-wheel drive and no torque is applied to the drive axle, the cam followers 34 are normally positioned at the bottom of the slots 35 and 36 between the pairs of bearing surfaces 50, 50' and the points 54, 54'. When torque is applied to the drive axle, it will cause the drive gear to rotate with the drive axle A in response to which the cam followers 34 will advance upwardly or outwardly first along one of the inclined surfaces 51 or 51' of the inner or outer cam members 37 and 38 then along the surfaces 52' of the outer cam 38. In advancing along the horizontal bearing surface 52' of the outer cam 38, it will simultaneously engage the flat bearing surface 56 of the inner cam thereby causing the inner cam 37 to be lifted away from engagement with the camlock tabs 41. Under the upward or outward movement of the cam followers 34 along the inclined bearing surfaces 51 and 51', the drive gear 32 will have been axially advanced a distance to move into initial engagement with the ring gear 26. FIG. 2 illustrates the movement of the cam follower 34 from a position at the bottoms of the slots, as shown in the upper section of FIG. 2, to an axially displaced position at the outboard ends of the slots, as shown in the lower section of FIG. 2, with the drive gear 32 correspondingly advancing into engagement with the ring gear 26 and the inner cam 37 moving away from engagement with the camlock extension tabs 41. As long as torque is applied to the drive axle A, the cam followers will remain at the outboard position and the drive gear will remain engaged with the ring gear 26. If torque is removed from the drive axle, the cam followers and drive gear will nevertheless remain in the outboard position until the drive axle is reversed in its direction of rotation. For this reason, it is necessary to bring the vehicle to a stop and to reverse the rotation of the drive axle in order to initiate disengagement of the drive gear 32 from the driven gear 26. Here it is necessary only to rotate the drive axle in a reverse direction over a limited time interval necessary for the drive gear to move out of frictional engagement with the ring gear. Spring 33 imposes an axial return force through the drive gear 32 and outer cam 38 so that flange 42 of the outer cam 38 has an interfacing frictional resistance with bearing 68 when it is stopped to undergo reverse rotation in relationship to the low rolling resistance of cam followers 34. During reverse rotation the cam followers 34 will roll to intercept the inclined faces 52 thereby relocking the inner cam 37 to the camlock 64 and spindlelock 24 to establish a zero ground condition. Under continuing reverse rotation, the cam followers 34 will move against and follow the outboard inclined surfaces 55 and 55' of the cams forcefully separating the drive gear 32 away from engagement with ring gear 26 and at the moment of separation when the drive shaft is no longer driven to rotate against drive train resistance, the drive gear can slide freely along the drive shaft until the cam followers 34 are seated against cam faces 50 and 50'. In order to further insure a clearance separation between the outboard face of drive gear 32 and the inboard face of ring gear 26, there is a difference in width of the tabs 40 of the inner cam 37 and the space between extension tabs 41 of the camlock so as to enable a back lash greater than required to again reversely rotate the cams 37 and 38 opposite the disengaging force thereby allowing the cam followers 34 to abut the cam faces 50 and 50' after the gears 32 and 26 have separated and the axle is no longer driveable in a reverse direction.

An important feature of the present invention resides in the cooperative disposition and arrangement of the spindle lock assembly 24 and cams 37 and 38 in such a way as to enable selective override of the normally zero ground or rotational resistance of the assembly 24 for smooth penetration of the drive gear 32 into engagement with the driven gear 26 during dynamic engagement as previously described. The spindle lock assembly is preferably comprised of the inner concentric lock 69 which is threaded onto the end of the spindle and fixed in place by a key element 58 inserted into aligned axial grooves between the lock nut 69 and threaded end 23 so that the lock nut 69 forms a fixed element on the end of the spindle. A series of elongated clutch springs 60 are spirally wound and disposed in flats or slight depressions which form axial grooves 62 at equally spaced circumferential intervals around the external surface of the lock nut 69. The springs are secured in place by a cage 61 which circumferentially encapsulates the springs and lock nut forming the spindlelock assembly 24. Camlock weldment 64 includes outwardly directed tabs 41 on a ledge surface 67 of the weldment and a series of circumferentially spaced legs 66 which project in an inboard direction away from the weldment 64 into outer concentric relation to the external surface of the cage 61. In this way, the legs are centered between a series of enlarged arcuate pockets 65 on the cage 61 which surround the external surfaces of the springs 60, the wall of the cage between the pockets being of a diameter less than the extent of projection of the springs 60 beyond the lock nut 69. Any tendency of the camlock weldment 64 to rotate with respect to the lock nut is normally resisted by the springs 60 which bear against the arcuate surfaces of their respective grooves 62 and pockets 65. The interconnection of the spindle lock assembly 24 through the camlock assembly 64 to the cam members 37 and 38 is completed by uniting the radially projecting ledge 67, thrust bearing 68 and the radially projecting flange 42 of the outer cam member 38 between the inboard counter-bored face of the adaptor 27 and the retaining ring 63, the latter being inserted in a groove 63' at the inboard extremity of the adaptor 27.

Figure 8:
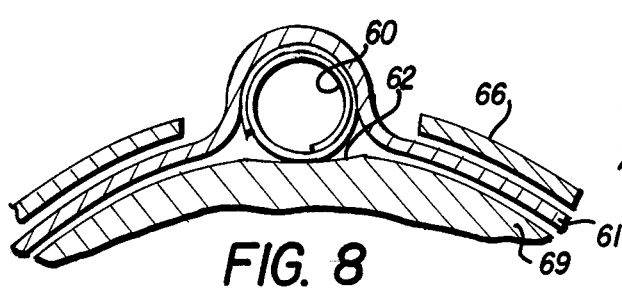
FIGS. 8 to 10 illustrate movement between elements of the override spindle lock assembly of FIGS. 6 and 7 under different applications of torque.
Figure 9:
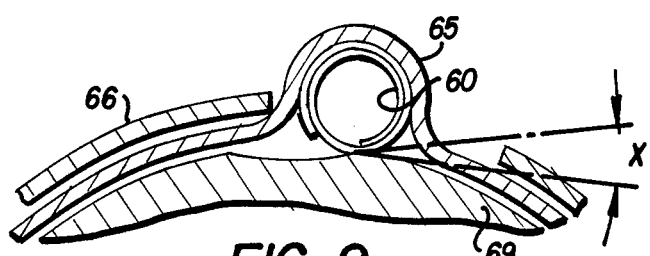
Figure 10:
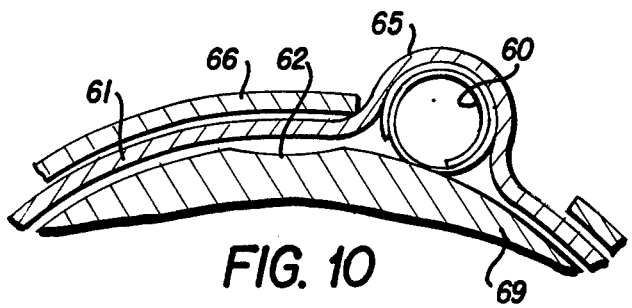

Alternate forms of spindle lock assemblies are illustrated in section in FIGS. 8 to 10 and 11 to 13, respectively, the form of invention as illustrated in FIGS. 2, 3, 6 and 7 corresponding to that of FIGS. 8 to 10 in which the greater circumference of each spring 60 is surrounded by a pocket 65. Preferably, the springs 60 are springs manufactured and sold under the trademark "SPIROL" by C.E.M. Co., Inc. of Danielson, Conn., and are in the form of elongated, axially directed helical coils which possess the capability of serving as force transmitting members in overrunning clutch applications. In the neutral position, the springs are encapsulated in the pocket 65 of the cage in centered relation to their respective flats or grooves 62. As noted, each flat has a greater radius of curvature than that of the spring thereby establishing a predetermined angle of incidence "X" and a predetermined gradual rise of the resultant resistance curve when the cage and encapsulated springs are caused to rotate. The legs 66 on the camlock weldment 64 are radially located to extend between the pockets 65 so that any tendency of the legs to rotate normally will be resisted by the pockets 65 bearing against the spring 60. However, when a rotational force or torque greater than the predetermined maximum, as established by the resistance curve of the springs, is applied to the camlock weldment 64 and legs 66 it will rotationally drive the cage 61 under sufficient torque to overcome the resistance of the springs and compress the springs 60 inwardly as illustrated in FIG. 9. If the weldment is driven further in the same direction, it will continue to rotate the cage 61 until the springs are realigned with the next pockets in succession, FIG. 10 illustrating the continuation of the movement of the cage and springs with respect to the pockets. Accordingly, when used in combination between the lock nut 69, cage 61 and camlock weldment 64, the spindle lock assembly 24 operates as a failsafe, shock-absorbing clutch which will prevent the application of abusive damaging forces to the drive components in the course of engagement and disengagement between the shaft or spindle and wheel hub under varying conditions of use. When the vehicle is shifted at zero speed or low speeds, the spindle lock assembly in effect establishes a zero ground or fixed element for the cam members 37, 38 in actuating the cam followers 34 and drive gear 32 and placing the vehicle in the four-wheel mode. However, under the conditions as reviewed in conjunction with FIG. 1, the windup time necessary to equalize torque in each front wheel as well as the probability of variance in tire adhesion necessitates limited yielding or deflection with increasing resistance in combination with the cam follower resistance particularly in their initial movement along the cam surfaces until the torque at the end of the longer shaft substantially matches that of the shorter shaft so that both hub locking assemblies simultaneously engage.

Figure 11:
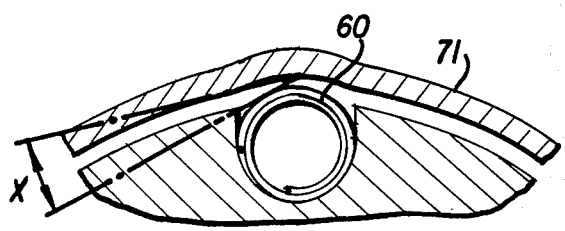
FIGS. 11 to 13 illustrate a modified form of spindle lock assembly for use in place of that illustrated in FIGS. 6 to 10.
Figure 12:
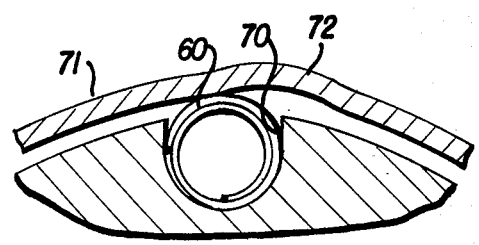
Figure 13:
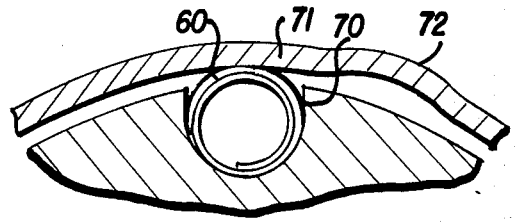
Figure 15:
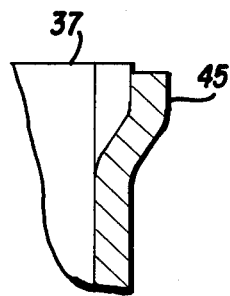
FIG. 15 is a fragmentary sectional view taken along line 15—15 of FIG. 3.

FIGS. 11 to 13 illustrate an alternate form of spindle lock assembly in which a series of deeper grooves or depressions 70 are formed on the outer periphery of the lock nut in place of the grooves 62. The cage 61 and legs 66 on weldment 64 are replaced by a cup 71 on the weldment 64, the cup having shallow pockets 72. In this way, each spring 60 is inserted into each of the grooves 70, and pockets 72 align with the external surface of the spring 60. Again, the lock nut is keyed to the spindle by means of a key inserted into one of the internal keyways aligned with a keyway on the spindle so that the nut itself is affixed as a stationary non-rotatable member and a zero ground for the failsafe clutch.

In the modified form, the springs 60 will project a limited distance beyond the outer periphery of the lock nut 24 sufficient to intercept the inner diameter of the wall of the cup 71 so that under normal conditions of use, as illustrated in FIG. 11, the spring 60 will offer a combined resistance sufficient to prevent any relative rotation of the weldment 64 with respect to the lock nut 69 and remain as a fixed part of the end of the spindle S. When a rotational force or torque greater than a predetermined maximum is applied to the inner cam member 37, it will rotationally drive the cup 71 and overcome the resistance of the springs once again by compressing the springs inwardly as illustrated in FIG. 12. Continued driving in the same direction will cause the cup 71 to advance until the spring aligns itself with the next successive pocket 72.

Figure 14:
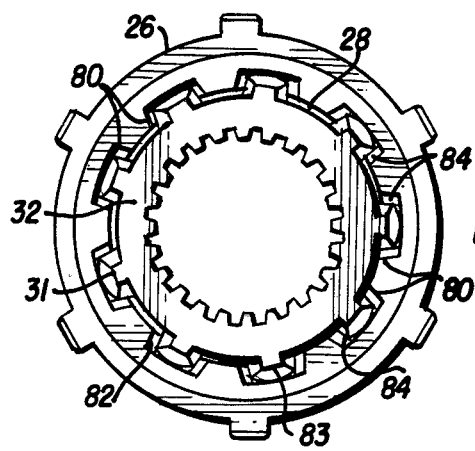
FIG. 14 is an end view illustrating the tooth configuration and relationship in a pair of drive and driven gears.

In either form of invention as described in FIGS. 8 to 13, the ability to override the normal resistance to rotation at the spindle lock will afford sufficient movement of the drive gear for smooth penetration into intermeshing relationship to the driven gear, for example, when the driven gear becomes the driving gear in the course of dynamic engagement, or while the vehicle is in motion, so as to prevent abusive torque applications to the drive train components. Smooth penetration of the drive gear into intermeshing engagement with the driven gear is further aided by forming a slight taper at the ends and along the crests of the teeth 28 and 31 of the gears 26 and 32, respectively. As seen by reference to FIGS. 3 and 14, each tooth 28 is tapered from its root toward its crest along opposite sides 80 and is further rounded and slightly tapered at its ends as designated at 81 so as to present a generally convex end surface in facing relation to the drive gears. Similarly, the ends of the drive gear teeth 31 are tapered or relieved on opposite sides away from the end face as designated at 82 and their crests are tapered as at 83 as well as along opposite side edges 84 along the length of each tooth.

In practice, and assuming that the operator desires to shift into four-wheel drive when the vehicle is in motion, a condition ensues in which the vehicle wheels and receiving gears 26 are under rotation when the drive gear of each clutch assembly is just starting to rotate. If the gears interface at this variance in speed, they will tend to develop a mild ratcheting or chattering as a result of the initial engagement between the teeth. This initial engagement will cause the drive gear to speed up and begin to penetrate the receiving gear 26 so as to transmit torque from the gear 26 into the drive gear 32. At a point where the torque transmitted exceeds that of the resistance to rotation of the spring 60, the outer cage will overcome the spring resistance and begin to rotate so as to rapidly permit the drive gear to catch up or match the ring gear speed and allow full penetration of the teeth or splines. It will be evident that the tapered edges of the teeth not only will facilitate quick and smooth synchronization particularly in cooperation with the spindle lock assembly, but also prevent deformation or possible damage to the teeth. These features in turn will facilitate rapid synchronization between a pair of clutch assemblies at opposite ends of an axle so as to overcome disproportionate torque applications to each of the clutch assemblies. In certain cases, synchronization can be enhanced further by regulating the pitch or slope of the inclined cam surfaces so as to initially resist or delay actuation of the first clutch assembly to which torque is applied and cause the differential to more quickly torque the lagging clutch assembly so that both can be actuated simultaneously toward engagement. Similarly, in a case where one wheel has good surface adhesion but the other is free-wheeling, the former clutch assembly is capable of resisting torque and will prevent the development of false reverse torques in the latter clutch assembly and insure that neither drive shaft will become free-wheeling.

It will be appreciated from the foregoing that the preferred and alternate forms of clutch assemblies as herein described operate in a manner corresponding to that described with reference to the clutch mechanism of my hereinbefore referred to U.S. Pat. No. 4,287,972 while affording the additional advantages of permitting dynamic engagement as well as synchronized engagement between a pair of clutch assemblies in a novel and improved manner. Again, in order to disengage the drive and driven gears, it is necessary to shift the vehicle transfer case from the four-wheel drive to the two-wheel drive mode whereby to disconnect the power train and power from the axle. In addition, the vehicle must be reversed in direction so that the vehicle hub will drive the ring gear 26 in a reverse direction, imparting reverse rotation to the drive gear 32 and the cam followers 34. Notwithstanding surface adhesion between the drive and driven gear teeth, the cam followers are forcibly advanced in a reverse or inboard direction by means of the closed cam slots so as to overcome the frictional adhesion between the teeth and in forcing the drive gear 32 away from the ring gear 26 into complete disengagement.

It is therefore to be understood that while the present invention has been described with particularity relative to the foregoing description of preferred and alternate embodiments, other modifications, changes and additions may be made and will be readily apparent to those of ordinary skill in the art without departing from the spirit and scope of the present invention.

I claim:

1. In a clutch having an actuator mechanism operative to drivingly interconnect rotatable drive and driven members when torque is applied to said drive member, said actuator mechanism comprising:

cam control means normally fixed against rotation;

cam follower means movable in response to the application of torque to said drive member to cause said drive member to be drivingly connected to said driven member; and a locking member including spaced inner and outer concentric portions, one of said portions permanently fixed against rotation, and releasable locking means interposed between said inner and outer concentric portions normally locking the other of said portions against rotation, said cam control means connected to said other of said portions so as to be normally locked against rotation, and said releasable locking means being releasable under applied rotative force to said other of said portions by said cam control means prior to release of said cam follower means from locking engagement with said locking member.

2. In a clutch according to claim 1, said releasable locking means being responsive to torque applied by said driven member to said drive member to provide for rotation of said cam control means prior to release of said cam follower means from locking engagement with said locking member.

3. In a clutch according to claim 1, said inner concentric portion being permanently fixed against rotation and said outer concentric portion being rotatable relative to said inner concentric portion when said locking means is released.

4. In a clutch according to claim 3, said releasable locking means defined by a plurality of springs arranged in spaced, circumferential relation between said inner and outer concentric portions, said springs being elongated in a direction parallel to the axis of rotation of said drive and driven members.

5. In a clutch according to claim 4, each of said springs being in the form of a helical wrap compressible under an applied rotative force to said outer concentric member, each of said springs interposed between normally aligned grooved areas between confronting surfaces of said inner and outer concentric portions.

6. In an automatic locking gear for drivingly connecting a driving member to a driven member automatically in response to the application of torque to the driving member wherein there is provided a stationary housing, a drive gear and driven gear associated with said drive member and driven member, respectively, said drive gear being movable into intermeshing engagement with said driven gear, a stationary housing provided with a locking member thereon, a cam member engaging said locking member so as to be normally fixed against rotation when torque is not applied to the driving member, and a cam follower interposed between said cam member and drive gear which is responsive to rotation of said driving member to release said cam member from rotative locking engagement with said locking member in advancing said drive gear into intermeshing engagement with said driven gear, the combination therewith comprising:

override means interposed between said locking member and housing responsive to the application of torque to said drive gear by said driven gear when said cam member is fixed against rotation with said locking means to release said locking member for rotation in response to application of torque before said cam member is disengaged from engagement with said locking member.

7. In an automatic locking gear according to claim 6, said locking member and said cam member having interengaging locking elements fixing said cam member against rotation while said cam member is free to move axially with respect to said locking member in response to the application of torque to said cam follower member.

8. In an automatic locking gear according to claim 7, said cam member having a pair of inner and outer concentric sleeves normally locked against rotation to said locking member, and means preventing axial movement of said outer concentric sleeve when said inner concentric sleeve is moved axially in response to application of torque thereto, said cam follower member being freely rotatable with said cam member when said inner concentric sleeve is released from rotative locking engagement with said locking member.

9. In an automatic locking gear according to claim 6, said cam follower member including at least one roller pin on said drive gear rotatable in response to rotation of said drive member and said cam member has at least one cam sleeve provided with a pin-engaging slot normally locked against rotation with said locking member, said slot provided with a series of bearing surfaces cooperating with said pin member so that relative rotation between said pin and sleeve in one direction causes axial sliding movement of said drive gear into engagement with said driven gear, and rotation of said drive gear in an opposite direction causes axial sliding movement of said drive gear away from said driven gear.

10. In an automatic locking gear according to claim 9, said cam member defined by inner and outer concentric sleeves each provided with a pin-engaging slot therein aligned for insertion of said roller pin therethrough, said inner and outer concentric sleeves being rotatable with one another while one said sleeve is free to undergo limited independent axial movement with respect to the other of said sleeves.

11. In an automatic locking gear according to claim 10, said pin-engaging slots including first inclined bearing surface portions facing in the direction of said driven gear and second inclined bearing surface portions facing in a direction away from said driven gear, said first inclined bearing surface portions each rising upwardly first along a relatively steep slope from a valley then merging into a more gradual slope and terminating in a circumferentially extending bearing surface.

12. In an automatic locking gear for drivingly connecting a driving member to a driven member automatically in response to the application of torque to the driving member wherein there is provided a stationary housing, a drive gear and driven gear associated with said drive member and driven member, respectively, said drive gear being movable into intermeshing engagement with said driven gear, a stationary housing provided with a locking member thereon, a cam member biased into engagement with the locking member so as to be normally fixed against rotation when torque is not applied to the driving member, and a cam follower interposed between said cam member and drive gear which is responsive to rotation of said driving member to disengage said cam member from engagement with said locking member in advancing said drive gear into intermeshing engagement with said driven gear, the improvement comprising:

each said drive gear and driven gear having complementary, axially extending teeth members movable into intermeshing engagement with one another, each tooth having a crest which is tapered laterally in midsection away from a common peak into opposite side surfaces of said tooth; and override means interposed between said locking member and housing responsive to the application of torque to said drive gear by said driven gear when said cam member is fixed against rotation with said locking means to release said locking member for rotation in response to application of torque until said cam member is disengaged from engagement with said locking member.

13. In an automatic locking gear according to claim 12, each said tooth having a cross-sectional configuration in the form of a hip roof with straight slanted surfaces inclined away from said midsection to intersect tapered side surfaces of said tooth.

14. In an automatic locking gear according to claim 12, said cam follower member including a plurality of circumferentially spaced dogs on said drive gear rotatable in response to said drive member, said cam member having a corresponding plurality of circumferentially spaced dog-engaging slots normally locked against rotation by said locking member, each said slot provided with a series of inclined bearing surfaces cooperating with said dogs so that relative rotation between said pins and slots in one direction causes axial sliding movement of said drive gear into engagement with said driven gear and rotation of said drive gear in an opposite direction causes axial sliding movement of said drive gear away from said driven gear.

15. In an automatic locking gear according to claim 12, said pin-engaging slots including first inclined bearing surface portions facing in the direction of said driven gear and second inclined bearing surface portions facing in a direction away from said driven gear, said first inclined bearing surface portions each rising upwardly first along a relatively steep slope from a valley then merging into a more gradual slope and terminating in a circumferentially extending bearing surface.

16. In a four-wheel drive for motor vehicles wherein an automatic locking gear is adapted to drivingly connect a drive axle and wheel hub automatically in response to application of torque to said drive axle having a stationary housing in which said drive axle is journaled, a drive gear keyed for rotation with said drive axle while being slidable in an axial direction independently of said drive axle, a driven gear keyed for rotation with said wheel hub while being slidable in an axial direction independently of said wheel hub, said drive gear being movable into intermeshing engagement with said driven gear, the combination therewith comprising:

a locking member mounted on said stationary housing;
a cam follower mounted on said drive gear;
actuator means normally fixed against rotation to said locking member, said actuator means including cam follower control means operative to advance said cam follower in a direction causing said drive gear to move into engagement with said driven gear in response to the application of torque to said drive gear, said actuator means in turn being released from engagement with said locking member in response to engagement between said drive gear and said driven gear; and override means interposed between said locking member and housing operative to release said locking member for limited rotation in response to the application of torque from said driven gear into said drive gear prior to releasing said actuator means from locking engagment with said locking member.

17. In a four-wheel drive for motor vehicles according to claim 16, said locking member defined by inner and outer spaced concentric sleeve members, said inner sleeve member being permanently affixed to said housing, said release means defined by a plurality of hollow compressible rotation limiting members of a normal diameter greater than the radial spacing between said inner and outer concentric sleeves, said limiting means disposed in recessed portions between said sleeve whereby to normally limit rotative movement of said outer concentric sleeve with respect to said inner concentric sleeve until the application of torque to said outer concentric sleeve is sufficient to compress said limiting means.

* * * * *